US 11,303,505 B2

(12) United States Patent
Duda

(10) Patent No.: US 11,303,505 B2
(45) Date of Patent: Apr. 12, 2022

(54) AGGREGATED CONTROL-PLANE TABLES

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/936,191

(22) Filed: Jul. 22, 2020

(65) Prior Publication Data
US 2022/0029877 A1  Jan. 27, 2022

(51) Int. Cl.
*G06F 15/173* (2006.01)
*H04L 41/0659* (2022.01)
*H04L 41/12* (2022.01)
*H04L 45/02* (2022.01)
*H04L 61/10* (2022.01)
*H04L 41/0654* (2022.01)
*H04L 41/0813* (2022.01)
*H04L 41/0677* (2022.01)
*G06F 15/16* (2006.01)
*H04L 101/622* (2022.01)

(52) U.S. Cl.
CPC ...... *H04L 41/0659* (2013.01); *H04L 41/0672* (2013.01); *H04L 41/0677* (2013.01); *H04L 41/0813* (2013.01); *H04L 41/12* (2013.01); *H04L 45/02* (2013.01); *H04L 61/10* (2013.01); *H04L 61/6022* (2013.01)

(58) Field of Classification Search
CPC ............ H04L 41/0659; H04L 41/0813; H04L 41/0677; H04L 41/0672; H04L 61/10; H04L 41/12; H04L 45/02; H04L 61/6022
USPC .................................................. 709/224, 238
See application file for complete search history.

(56) References Cited

U.S. PATENT DOCUMENTS

| | | | |
|---|---|---|---|
| 7,453,883 B1* | 11/2008 | Lynch | H04L 45/00 370/389 |
| 2008/0049621 A1* | 2/2008 | McGuire | H04L 12/4645 370/236.2 |
| 2008/0049717 A1* | 2/2008 | Jamieson | H04L 12/2874 370/351 |
| 2013/0230047 A1* | 9/2013 | Subrahmaniam | H04L 47/2441 370/392 |
| 2013/0347103 A1* | 12/2013 | Veteikis | H04L 43/04 726/22 |
| 2014/0195666 A1* | 7/2014 | Dumitriu | H04L 49/70 709/223 |

(Continued)

*Primary Examiner* — Karen C Tang
(74) *Attorney, Agent, or Firm* — Chamberlain, Hrdlicka, White, Williams & Aughtry

(57) ABSTRACT

A method includes obtaining network data. The data includes a first portion of the network data obtained from a first network device of at least two network devices, and a second portion of the network data obtained from a second network device of the at least two network devices. The method also includes obtaining, using the network data, enhanced network data that indicates a presence of a network flaw of the network, the network flaw is not indicated by either of the first portion or the second portion in isolation from the other portion. The method further includes performing a network enhancement action set using the enhanced network data to remediate the network flaw.

22 Claims, 13 Drawing Sheets

(56) References Cited

U.S. PATENT DOCUMENTS

| | | | | |
|---|---|---|---|---|
| 2015/0326474 A1* | 11/2015 | Retana | .................... | H04L 45/54 |
| | | | | 370/254 |
| 2015/0326526 A1* | 11/2015 | Zeng | .................... | H04L 45/745 |
| | | | | 370/392 |
| 2015/0358233 A1* | 12/2015 | Wang | .................. | H04L 61/6013 |
| | | | | 370/392 |
| 2017/0034052 A1* | 2/2017 | Chanda | ............... | H04L 12/4633 |
| 2017/0034053 A1* | 2/2017 | Chanda | ................ | H04L 45/586 |
| 2017/0279837 A1* | 9/2017 | Dasgupta | .............. | H04L 41/142 |
| 2018/0131603 A1* | 5/2018 | Ye | ....................... | H04L 45/7457 |
| 2018/0324105 A1* | 11/2018 | Gillon | .................... | H04L 45/02 |
| 2019/0182213 A1* | 6/2019 | Saavedra | ............ | H04L 63/0218 |
| 2020/0092368 A1* | 3/2020 | Shiba | .................... | H04L 45/54 |

\* cited by examiner

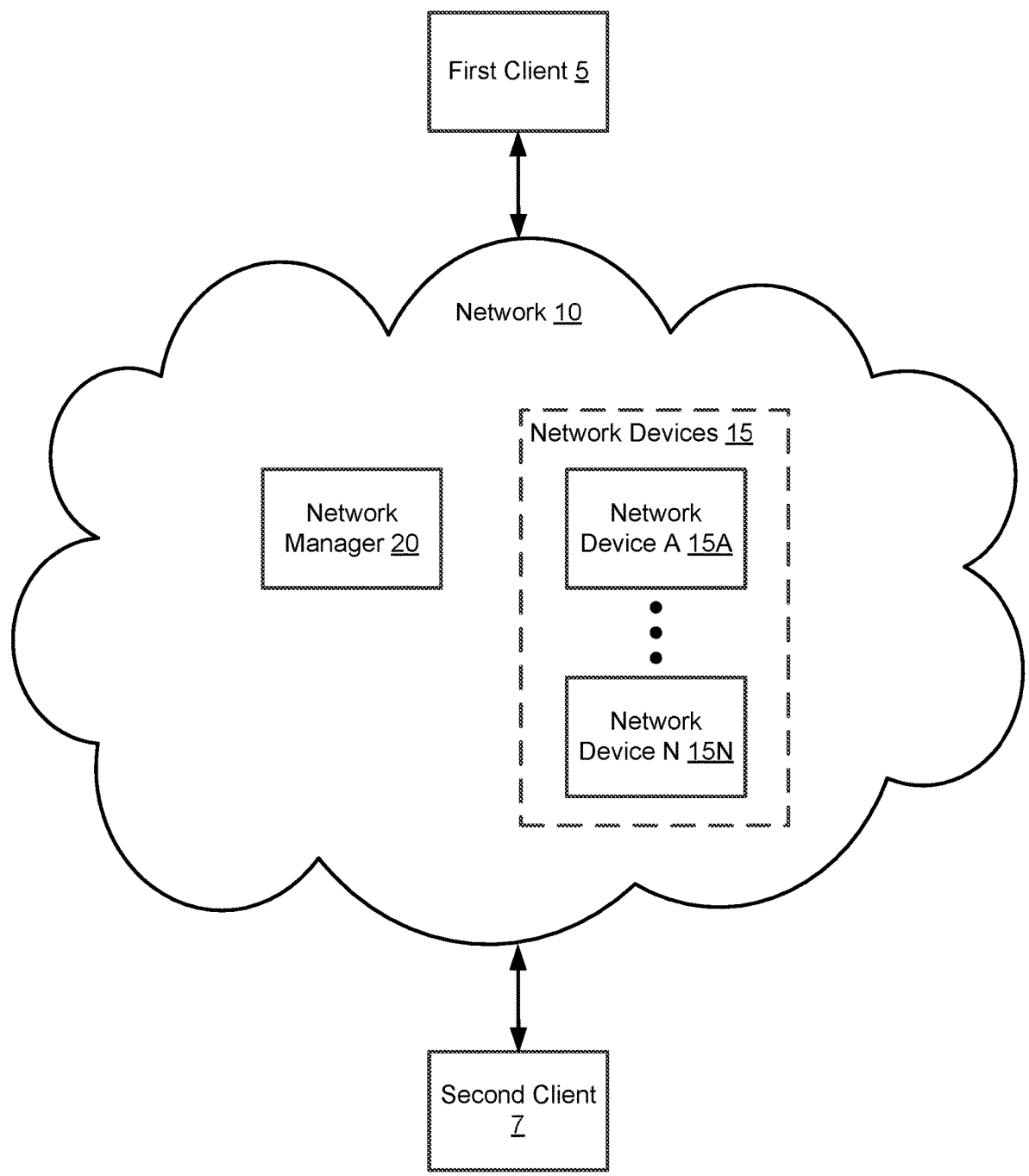
FIG. 1.1

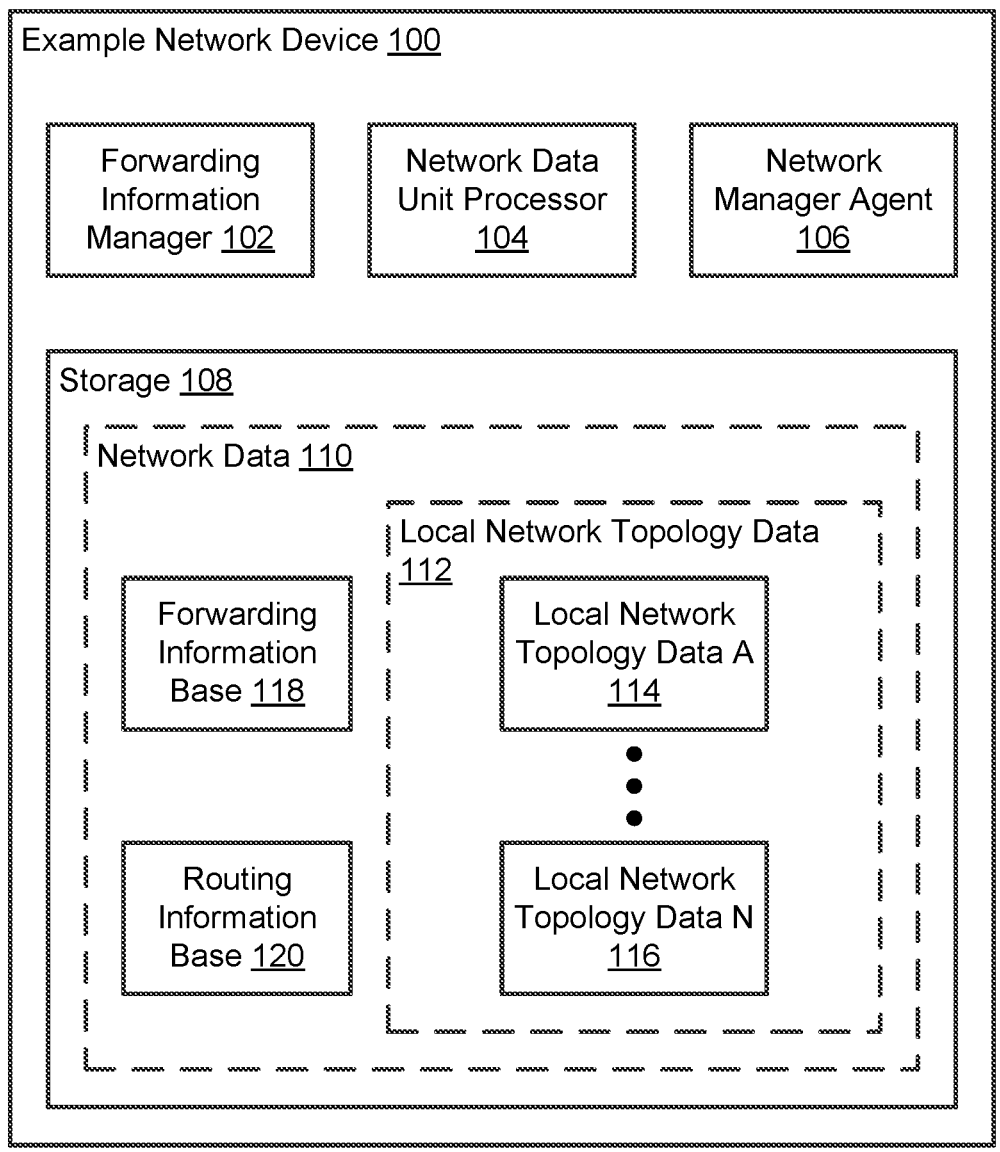
FIG. 1.2

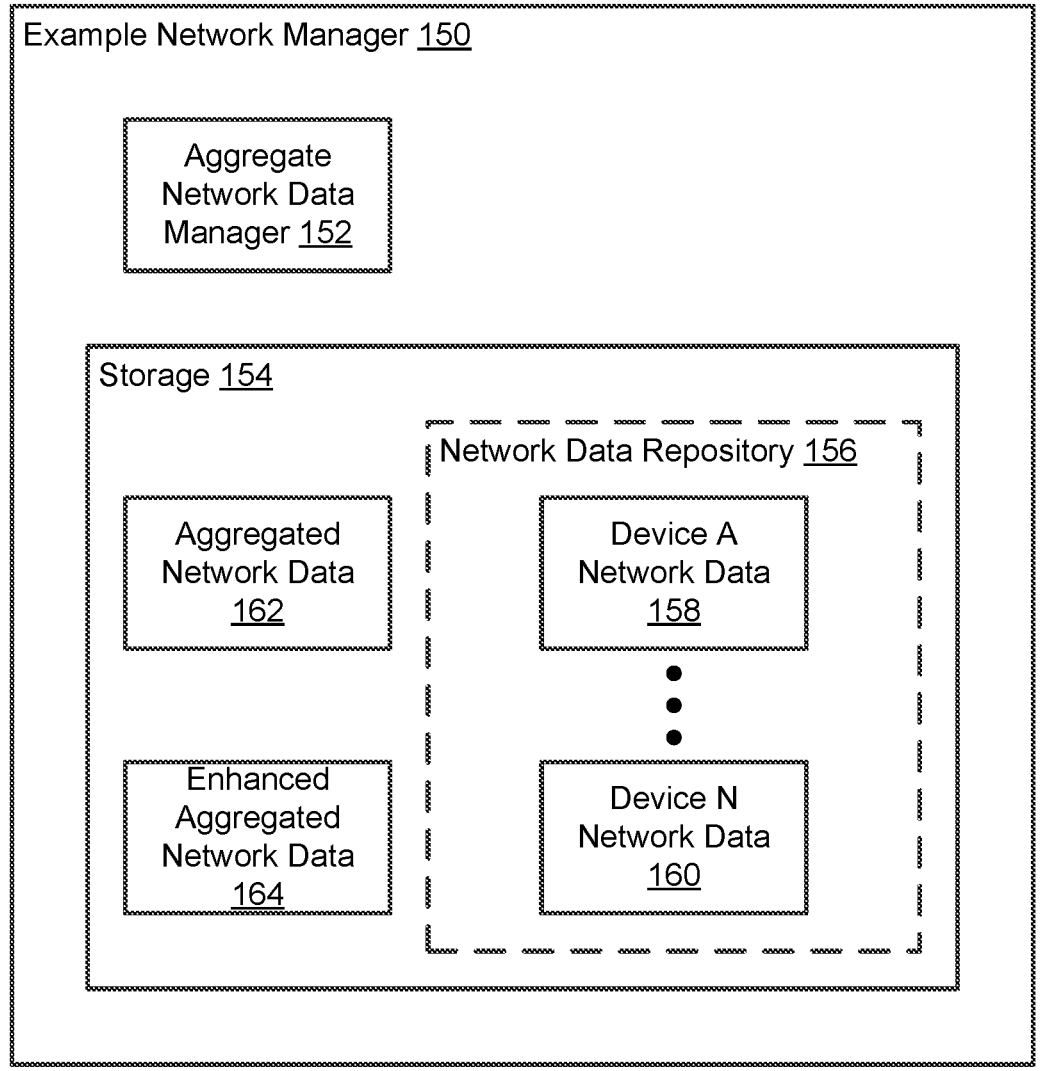
FIG. 1.3

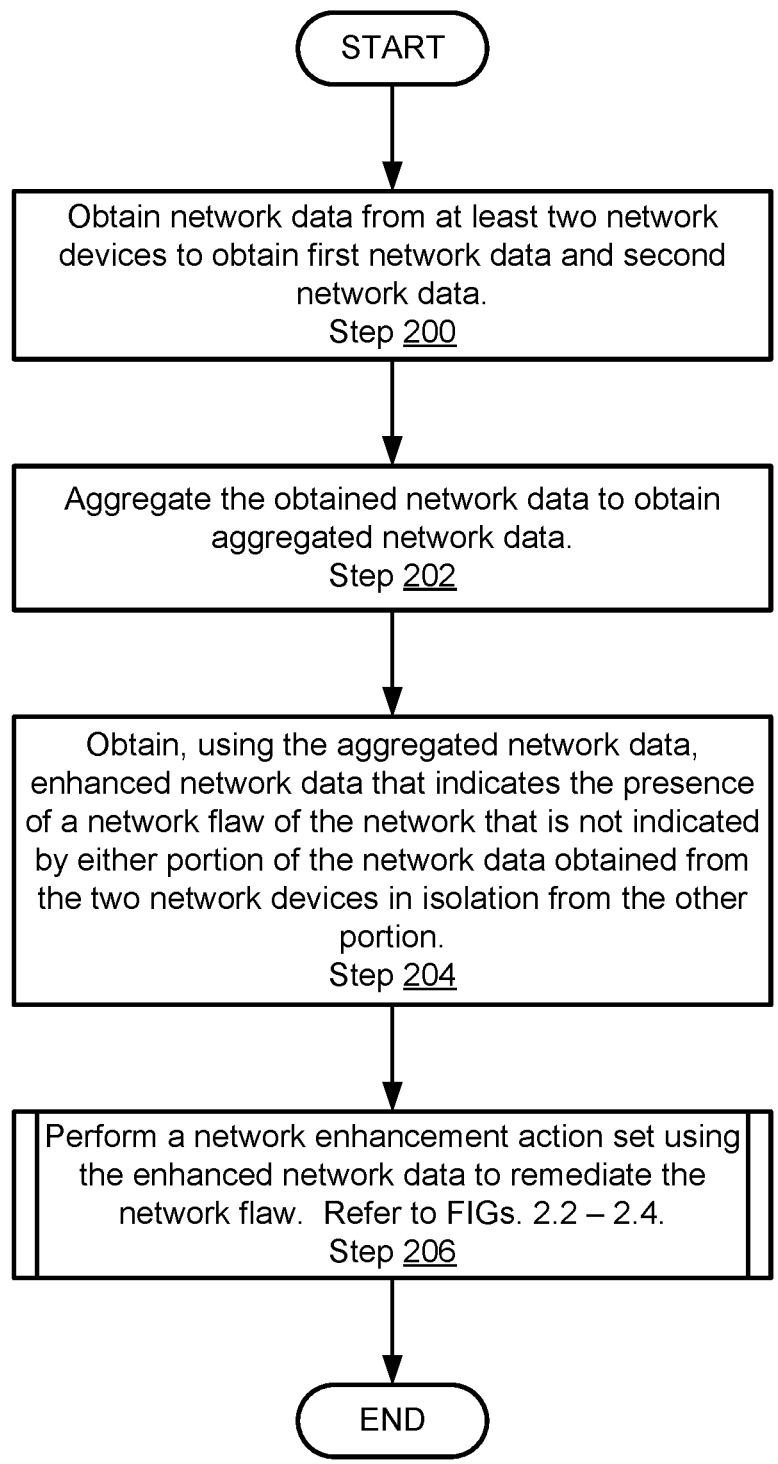
FIG. 2.1

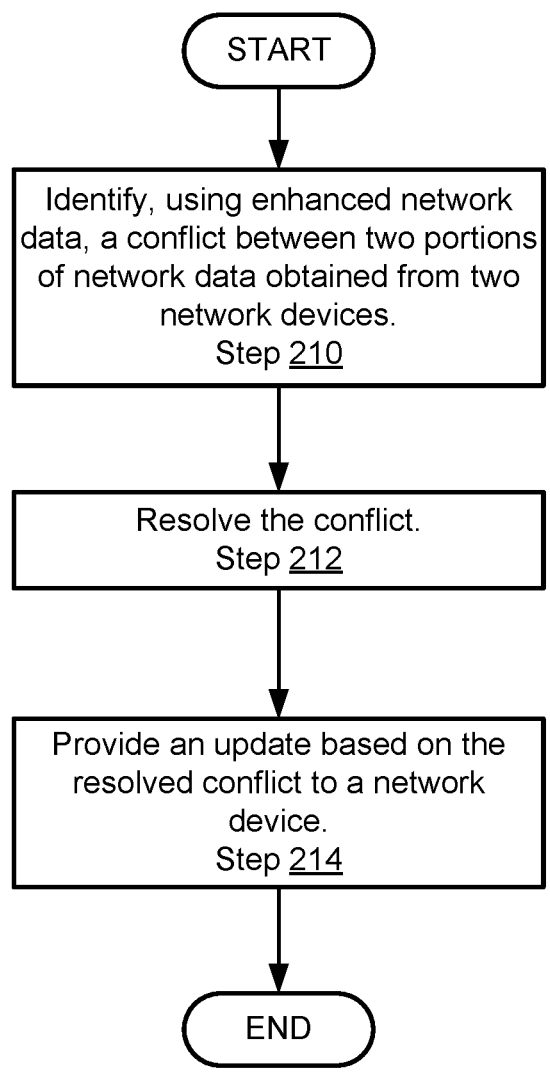
FIG. 2.2

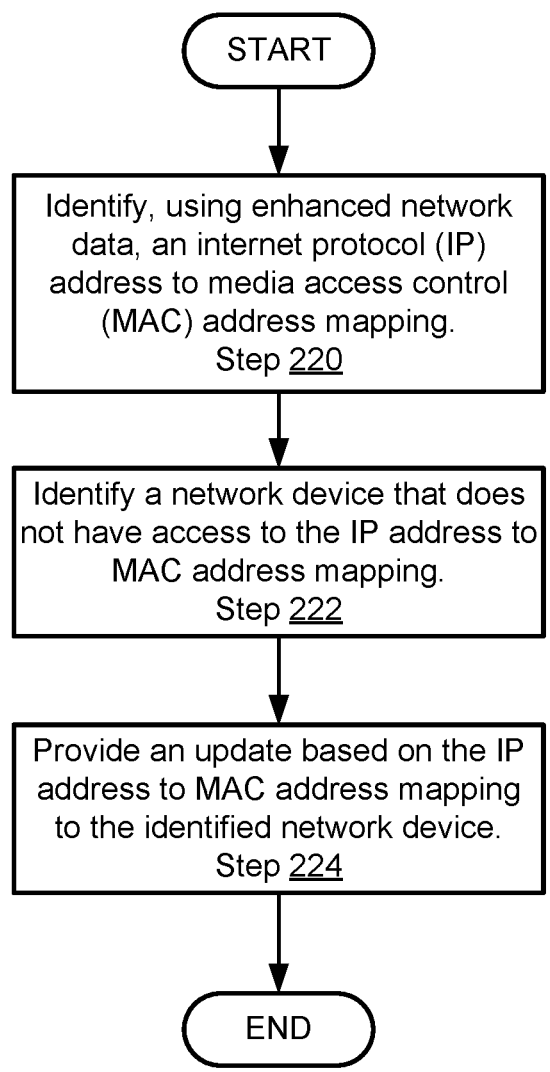
FIG. 2.3

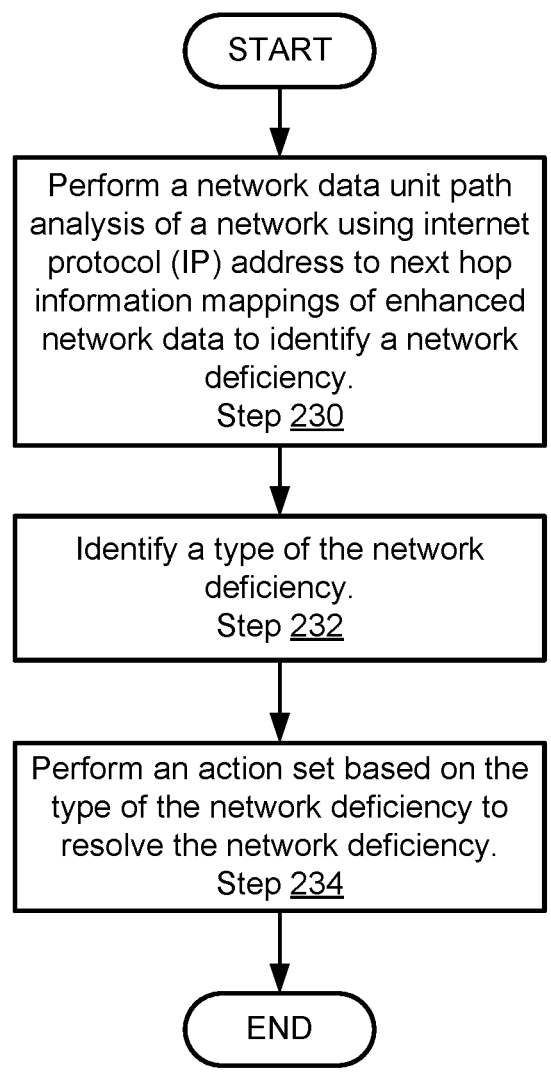
FIG. 2.4

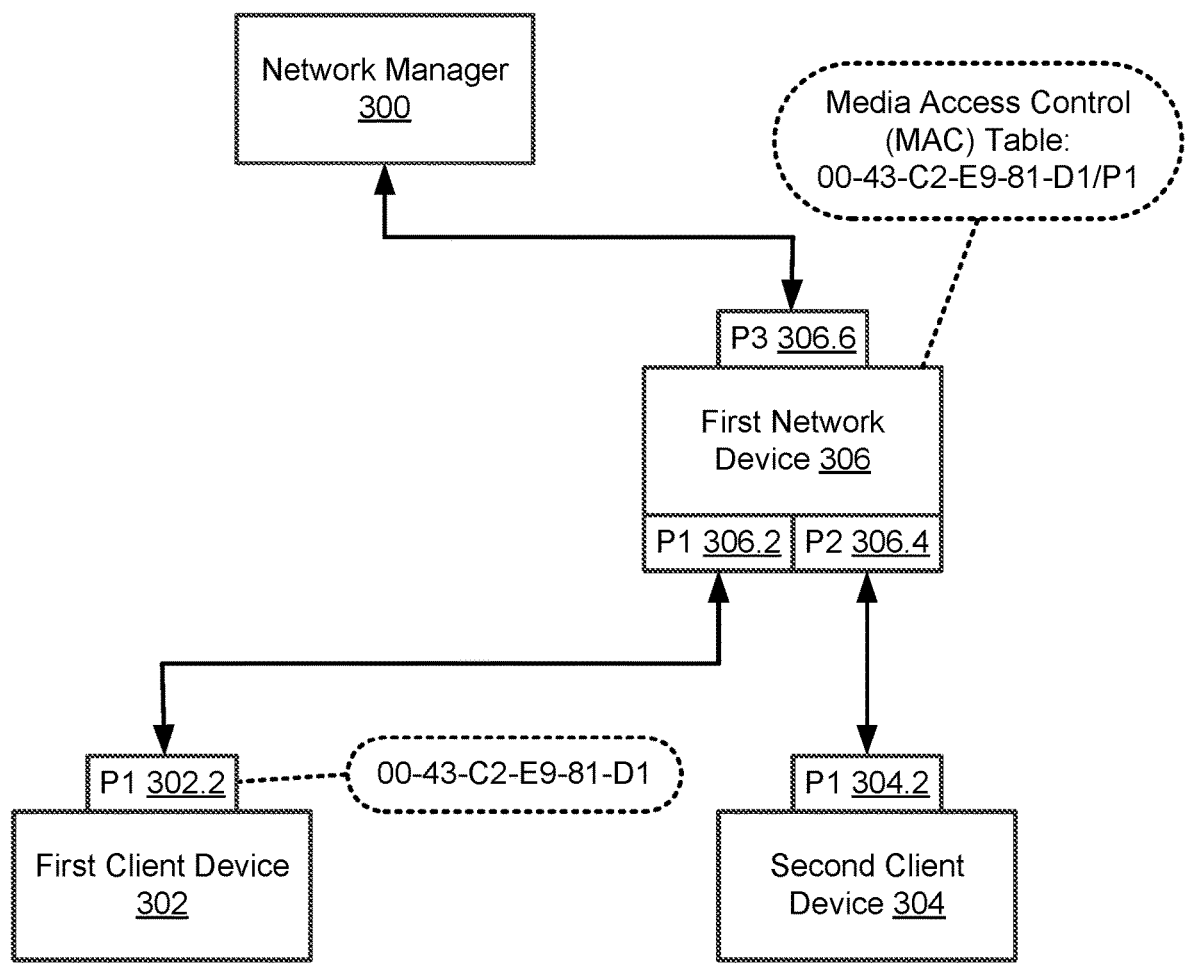
FIG. 3.1

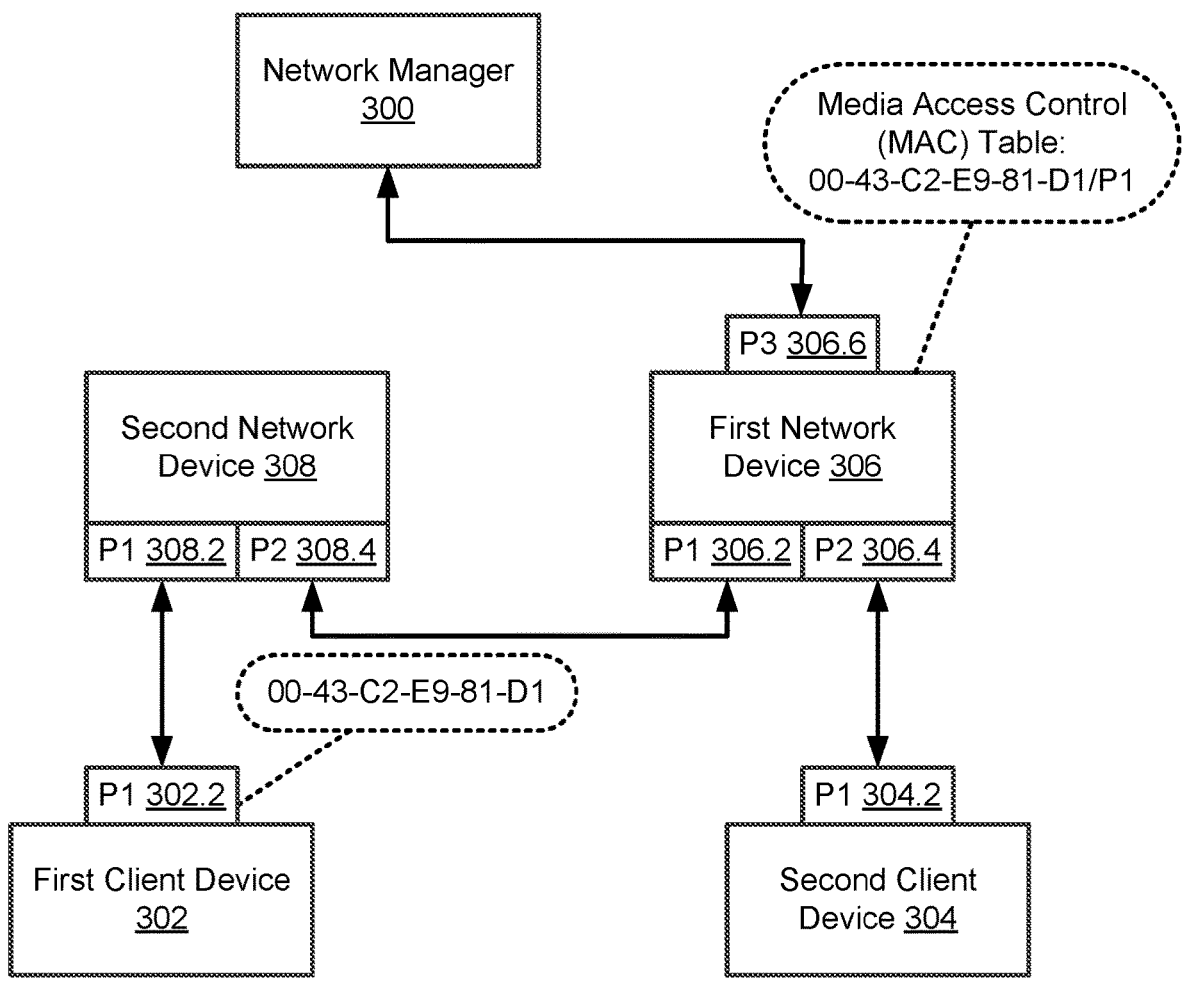
FIG. 3.2

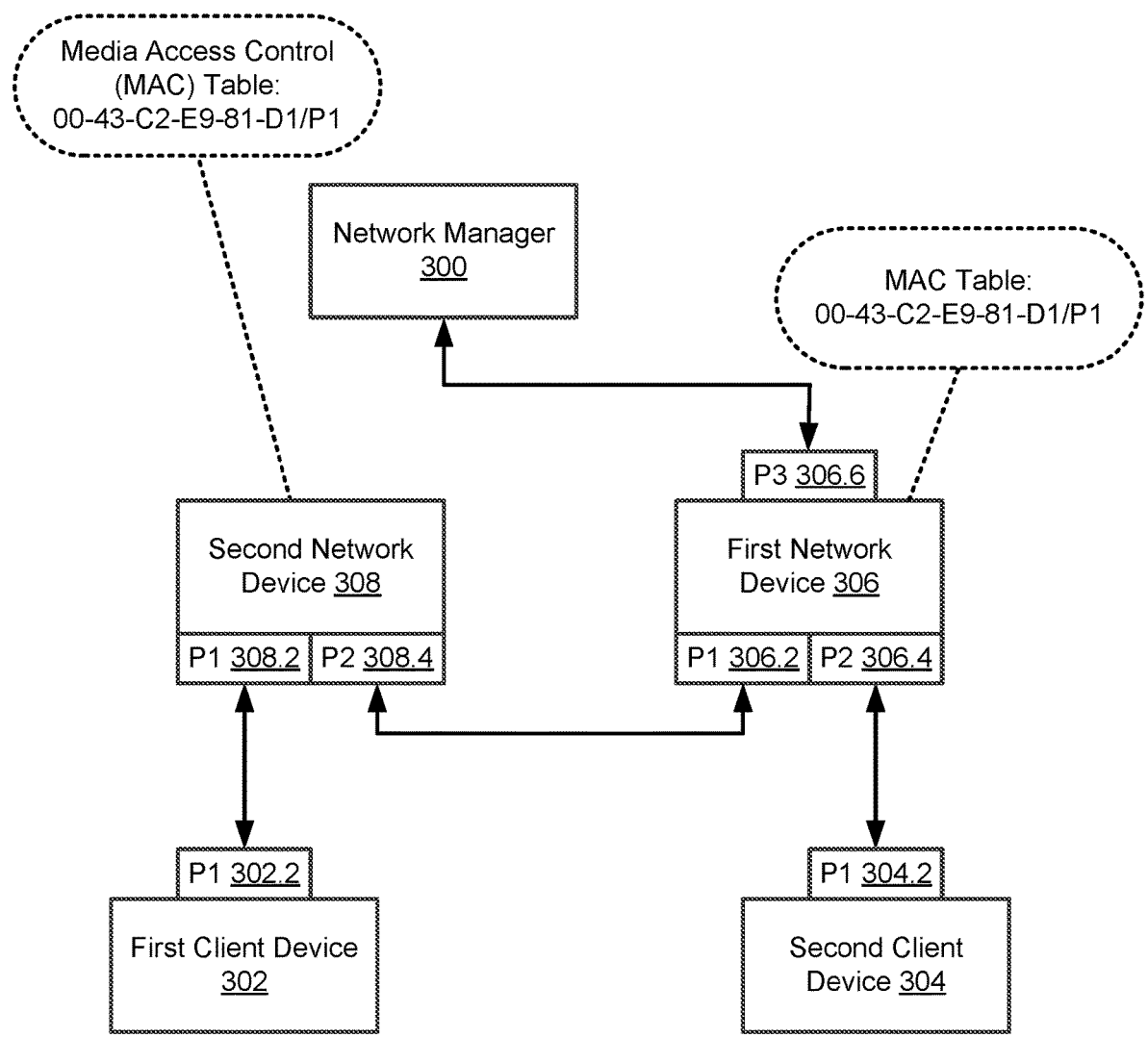
FIG. 3.3

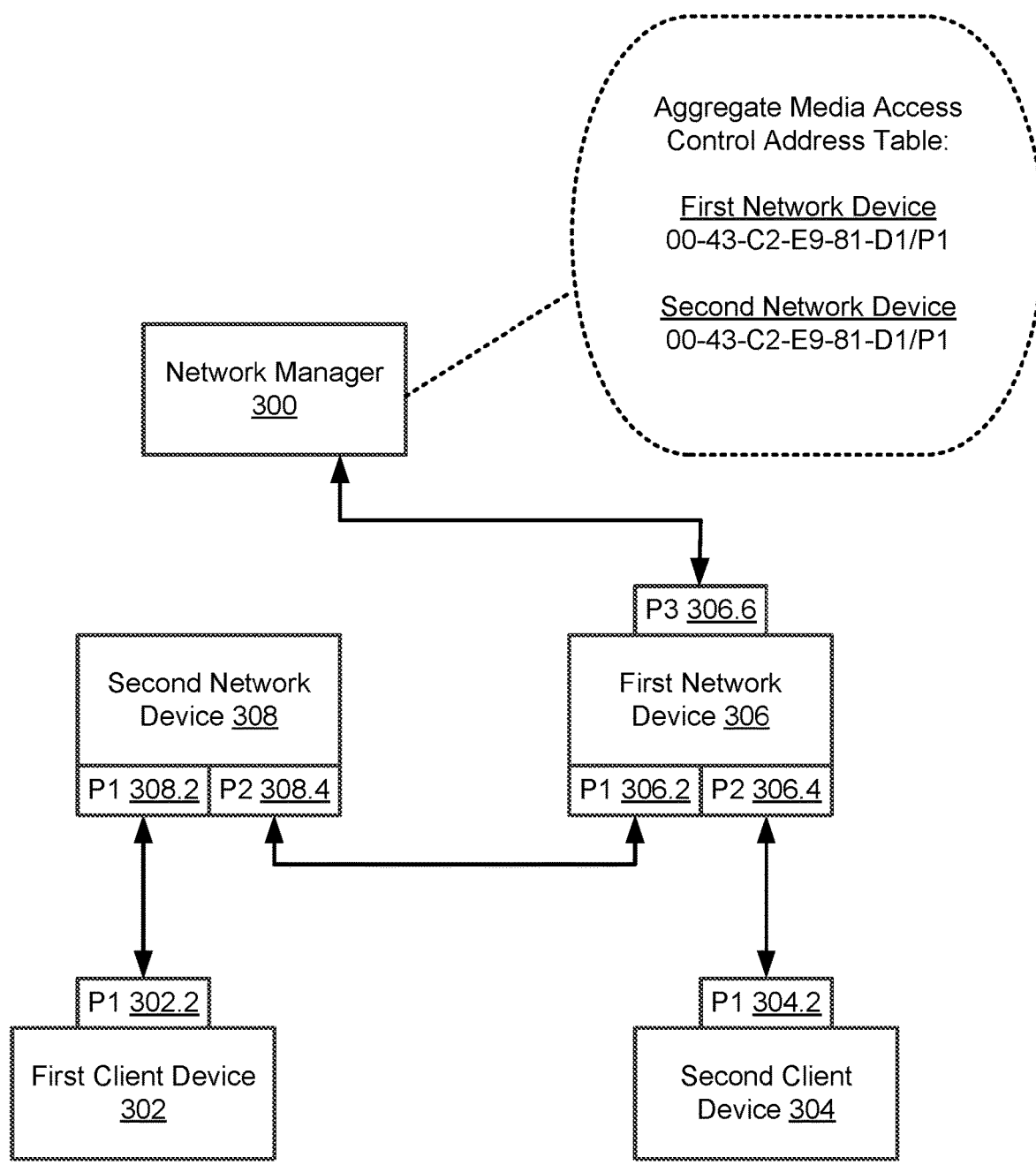
FIG. 3.4

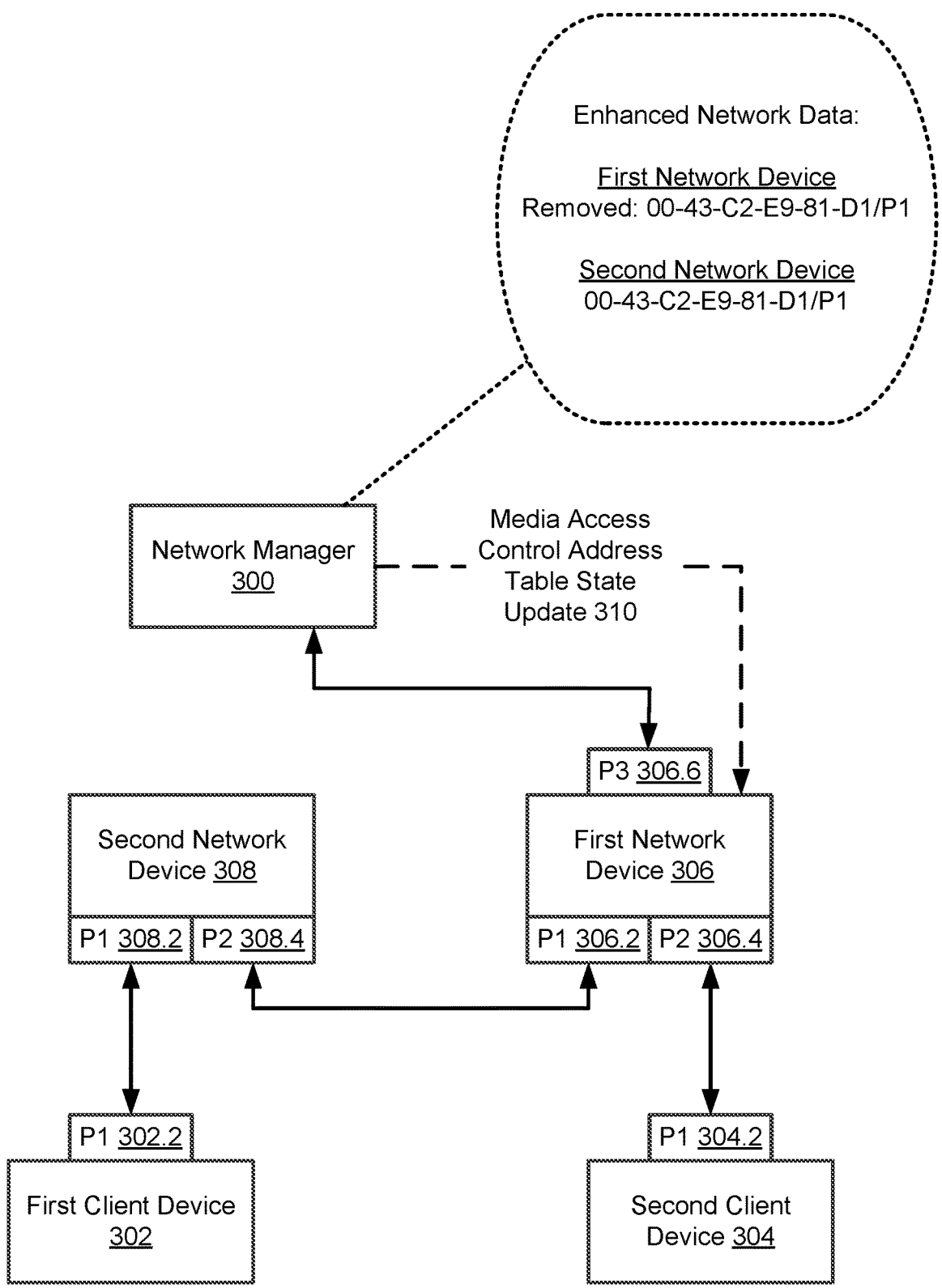
FIG. 3.5

AGGREGATED CONTROL-PLANE TABLES

BACKGROUND

A communication system may enable devices to communicate with one another.

The communication system may include devices that relay information from a sending device to a destination device.

SUMMARY

In one aspect, a network manager in accordance with one or more embodiments disclosed herein is communicatively coupled to at least two network devices and configured to manage a network that comprises the at least two network devices, wherein the network manager. The network device includes a processor and a storage for storing network data including a first portion of the network data obtained from a first network device of the at least two network devices, and a second portion of the network data obtained from a second network device of the at least two network devices. The network manager also includes a network data manager, which when executed by the processor, obtains the network data; obtains, using the network data, enhanced network data that indicates a presence of a network flaw of the network, the network flaw is not indicated by either of the first portion or the second portion in isolation from the other portion; and performs a network enhancement action set using the enhanced network data to remediate the network flaw.

In one aspect, a method in accordance with one or more embodiments disclosed herein includes obtaining network data including a first portion of the network data obtained from a first network device of at least two network devices, and a second portion of the network data obtained from a second network device of the at least two network devices; obtaining, using the network data, enhanced network data that indicates a presence of a network flaw of the network, the network flaw is not indicated by either of the first portion or the second portion in isolation from the other portion; and performing a network enhancement action set using the enhanced network data to remediate the network flaw.

In one aspect, a non-transitory computer readable medium in accordance with one or more embodiments disclosed herein includes computer readable program code, which when executed by a computer processor enables the computer processor to perform a method, the method including obtaining network data including a first portion of the network data obtained from a first network device of at least two network devices, and a second portion of the network data obtained from a second network device of the at least two network devices; obtaining, using the network data, enhanced network data that indicates a presence of a network flaw of the network, the network flaw is not indicated by either of the first portion or the second portion in isolation from the other portion; and performing a network enhancement action set using the enhanced network data to remediate the network flaw.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a logical diagram of a system in accordance with one or more embodiments disclosed herein.

FIG. 1.2 shows a logical diagram of a network device in accordance with one or more embodiments disclosed herein.

FIG. 1.3 shows a logical diagram of a network manager in accordance with one or more embodiments disclosed herein.

FIG. 2.1 shows a flowchart of a method of managing a network in accordance with one or more embodiments disclosed herein.

FIG. 2.2 shows a flowchart of method of enhancing a network by removing inaccurate information in accordance with one or more embodiments disclosed herein.

FIG. 2.3 shows a flowchart of method of enhancing a network by distributing information in accordance with one or more embodiments disclosed herein.

FIG. 2.4 shows a flowchart of method of enhancing a network by removing topological deficiencies in accordance with one or more embodiments disclosed herein.

FIGS. 3.1-3.5 show a non-limiting example of a system over time.

DETAILED DESCRIPTION

Figure 4:
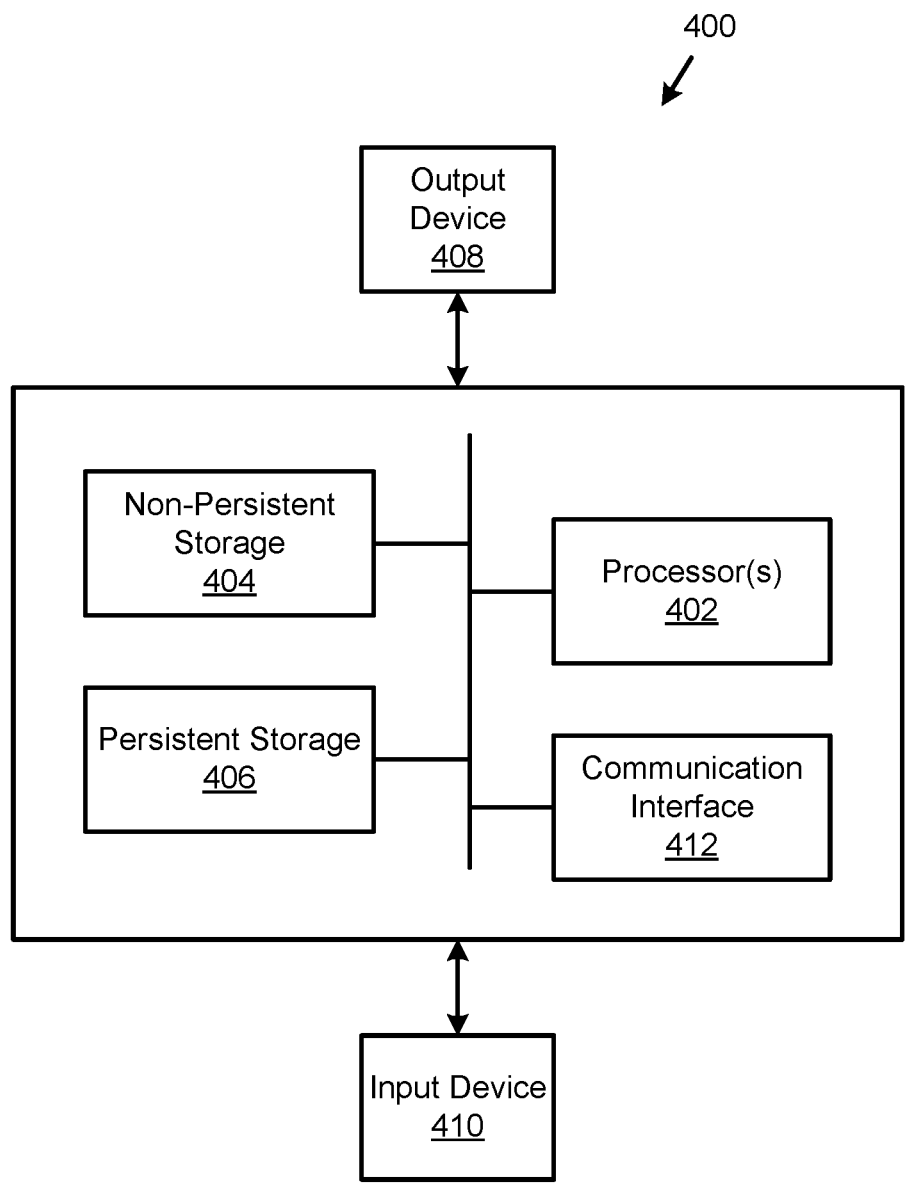
FIG. 4 shows a logical diagram of a computing device in accordance with one or more embodiments disclosed herein.

Networks may include any number of network devices that facilitate distribution of network data units across a network. When a network device obtains a network data unit, it must decide how to direct the network data unit towards the network data unit's destination. The decision is made, at least in part, using information (referred to herein as "network data") regarding the topology of the network.

The network data collected and maintained by any network device may be limited in scope, may be inaccurate, and/or may include other deficiencies. For example, the network device may only be able to update its network data sporadically resulting in portions of the network data becoming outdated thereby no longer reflecting the actual topology of the network. In another example, a first network device may lack information in its network data that a second network device includes in its network data. The second network device may be required to expend its own computation resources and/or the computational resources of other devices to obtain the information that it lacks.

One or more embodiments disclosed herein provide methods, devices, and systems for enhancing the operation of networks by aggregating network data from multiple sources. By aggregating the network data, a broader view of the network may be obtained than that viewed by any source individually.

The resulting broader view of the network may enable the network to (i) enhance its operation by removing inaccurate information included in network data of network devices, (ii) remediate network deficiencies such as loops, (iii) distribute information regarding the topology of the network to network devices that would otherwise have to expend computing resources to learn the information, (iv) reduce the cognitive burden on persons tasked with making decisions regarding management of the network, and/or (v) provide other improvements to the operation and/or usability of the network.

In the text that follows, a description of components of a system in accordance with embodiments of the invention is provided with respect to FIGS. 1.1-1.3. A description of methods that may be performed by the system of FIG. 1.1 is provided with respect to FIGS. 2.1-2.4. An example of a series of actions that may be performed by the system of FIG. 1.1 is provided with respect to FIGS. 3.1-3.5. Lastly, a description of a computing device that may be used to implement the system of FIG. 1.1 is provided with respect to FIG. 4.

Specific embodiments will now be described with reference to the accompanying figures. In the following description, numerous details are set forth as examples. It will be understood by those skilled in the art, and having the benefit of this document, which one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

FIG. 1.1 shows a diagram of an example system in accordance with one or more embodiments described herein. The system may include clients (e.g., 5, 7) that communicate with one another (and/or other devices not illustrated in FIG. 1.1) using network (10). To enable clients to communicate with one another, network (10) may provide services to the clients including network data unit forwarding services. By providing network data unit forwarding services, network (10) may enable clients to communicate with each other and/or other devices.

To provide network data unit forwarding services, network (10) may include any number of network devices (15). Network devices (15) may implement any number and/or type of communication protocols that enable network data units provided to network (10) by clients (e.g., 5, 7) to be provided to devices to which the network data units are addressed.

To implement the communication protocols, network devices (15) may maintain information (referred to herein as network data) regarding the network environment in which the network devices (15) reside. The network devices (15) may maintain the network data by (i) obtaining information regarding the network environment and (ii) updating one or more data structures in which network data is stored based on the obtained information regarding the network environment.

Network devices (15) may obtain information regarding the network environment as part of implementing the communication protocols and/or may implement network discovery protocols. However, the information regarding the network environment obtained through these methods may be limited. For example, the aforementioned methods of obtaining information regarding the network environment may be, for example, (i) limited in scope (e.g., only enable a network device to obtain limited information regarding its neighbors), (ii) inaccurate (e.g., incorrect due to bit flips or other issues), and/or (iii) time consuming (e.g., changes in topology of a network may not be identified as soon as the change is made). The information obtained by network devices (15) may be limited in other manners without departing from embodiments disclosed herein.

Due to the limitations regarding the collection of information regarding the network environment, each of the network devices (e.g., 15A, 15N) of network (10) may have a limited and/or partially inaccurate view (e.g., a local view) of network (10). Consequently, when network data that only includes a local view is utilized by network devices (15) or other devices that may utilize such network data, the resulting decisions made based on the network data may be different from those made if the network data included additional information. For example, if the network data included or was based on information obtained by more than one network device regarding network (10) the network data may be of higher accuracy, more complete, and/or may otherwise enable better decisions to be made when compared to network data that is only based on a local view of network (10).

Embodiments disclosed herein may provide methods, devices, and/or systems for improving network data. A system in accordance with embodiments disclosed herein may include network manager (20). Specifically, network manager (20) of network (10) may (i) collect network data from network devices (15), (ii) aggregate the collected network data, and/or (iii) use the aggregated network data to improve the operation of network (10). By doing so, network (10) may be more easily managed, more responsive, and/or better manage network data unit traffic (e.g., more efficiently route network data units between network devices (15) as network data units traverse network (10) from a source to a destination). Network (10) may provide additional, fewer, and/or different benefits without departing from embodiments disclosed herein.

Any of the components of FIG. 1.1 may be operably connected by any combination and/or number of wired and/or wireless connections.

Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.4. The devices of FIG. 1.1 may be implemented using other types of computing devices without departing from the embodiments disclosed herein. For additional details regarding computing devices, refer to FIG. 4.

The devices of FIG. 1.1 may be implemented using logical devices without departing from the embodiments disclosed herein. For example, the devices of FIG. 1.1 may be implemented using virtual machines that utilize computing resources of any number of physical computing devices (refer to FIG. 4) to provide their respective functionalities. The devices of FIG. 1.1 may be implemented using other types of logical devices without departing from the embodiments disclosed herein.

To further clarify aspects of network devices, a diagram of an example of a network device is provided in FIG. 1.2. Any of the network devices of FIG. 1.1 may be similar to the example network device illustrated in FIG. 1.2.

FIG. 1.2 shows a logical diagram of example network device (100) in accordance with one or more embodiments described herein. Example network device (100) may provide network data unit forwarding services.

To provide the above noted functionality of example network device (100), example network device (100) may include forwarding information manager (102), network data unit processor (104), network manager agent (106), and storage (108). Each of these components of the example network device (100) is discussed below.

In one or more embodiments disclosed herein, forwarding information manager (102) is implemented using a hardware device including circuitry. Forwarding information manager (102) may include, for example, one or more of a digital signal processor, a field programmable gate array, and/or an application specific integrated circuit. The circuitry of the aforementioned devices may be adapted to provide the functionality of forwarding information manager (102). Forwarding information manager (102) may be implemented using other types of hardware devices without departing from the embodiments disclosed herein.

In one or more embodiments disclosed herein, forwarding information manager (102) is implemented using computing code stored on a persistent storage that when executed by a processor of example network device (100) performs the functionality of forwarding information manager (102). The processor may be a hardware processor including circuitry such as, for example, a central processing unit or a microcontroller. The processor may be other types of hardware devices for processing digital information without departing from the embodiments disclosed herein.

In one or more embodiments disclosed herein, forwarding information manager (102) provides network data management services. The network data management services may include integrating information obtained regarding a network environment in which the example network device (100) resides into a routing information base (e.g., 120) and a forwarding information base (e.g., 118).

When information regarding the network environment in which the example network device (100) resides is obtained, the information may be stored as local network topology data (112). The local network topology data (112) may take the form of tables or other types of data structures that include raw data obtained through network discovery protocols, communication protocols, or other methods. Information obtained through each of these mechanisms may be maintained as separate portion of local network topology data (112). In this form, the information regarding the network environment may be difficult and/or computationally expensive to use for network data unit forwarding purposes.

Forwarding information manager (102) may integrate the various portions of the local network topology data (e.g., 114, 116) into a routing information base (120). The routing information base (120) may include specific information placed in a particular format that enables information useful for network data unit forwarding purposes to be more easily identified.

Forwarding information manager (102) may maintain forwarding information base (118) using the information included in routing information base (120). Forwarding information base (118) may include efficient mappings between information included in network data units and information that may be used to forward the network data units (e.g., mappings between destination internet protocol addresses and next hops). In some embodiments, forwarding information base (118) may be loaded into special purposes hardware of network data unit processor (104) or other type of specialized hardware devices that may be used to forward network data units.

In one or more embodiments disclosed herein, network data unit processor (104) is implemented using a hardware device including circuitry. Network data unit processor (104) may include, for example, one or more of a digital signal processor, a field programmable gate array, and/or an application specific integrated circuit. The circuitry of the aforementioned devices may be adapted to provide the functionality of network data unit processor (104). Network data unit processor (104) may be implemented using other types of hardware devices without departing from the embodiments disclosed herein.

In one or more embodiments disclosed herein, network data unit processor (104) is implemented using computing code stored on a persistent storage that when executed by a processor of example network device (100) performs the functionality of network data unit processor (104). The processor may be a hardware processor including circuitry such as, for example, a central processing unit or a microcontroller. The processor may be other types of hardware devices for processing digital information without departing from the embodiments disclosed herein.

Network data unit processor (104) may provide network data unit forwarding services. The network data unit forwarding services may include (i) obtaining network data units, (ii) identifying how to forward the network data units, and (iii) forwarding the network data units.

To identify how to forward the network data units, network data unit processor (104) may utilize forwarding information base (118). Network data unit processor (104) may perform a look up using information included in each network data unit to identify information included in the forwarding information base (118) that may be used to forward each respective network data unit.

In one or more embodiments disclosed herein, network manager agent (106) is implemented using a hardware device including circuitry. Network manager agent (106) may include, for example, one or more of a digital signal processor, a field programmable gate array, and/or an application specific integrated circuit. The circuitry of the aforementioned devices may be adapted to provide the functionality of network manager agent (106). Network manager agent (106) may be implemented using other types of hardware devices without departing from the embodiments disclosed herein.

In one or more embodiments disclosed herein, network manager agent (106) is implemented using computing code stored on a persistent storage that when executed by a processor of example network device (100) performs the functionality of network manager agent (106). The processor may be a hardware processor including circuitry such as, for example, a central processing unit or a microcontroller. The processor may be other types of hardware devices for processing digital information without departing from the embodiments disclosed herein.

Network manager agent (106) may provide network manager services. Network manager services may include (i) providing copies of all, or a portion, of network data (110) to network manager (20, FIG. 1.1), (ii) obtaining updates regarding network data (110) from network manager (20, FIG. 1.1), and/or (iii) updating network data (110) based on the obtained updates.

By doing so, network manager agent (106) may enable network manager (20, FIG. 1.1) to obtain information regarding example network device's (100) local view of network (10, FIG. 1.1). Additionally, network manager agent (106) may enable network manager (20, FIG. 1.1) to modify example network device's (100) view of network (10, FIG. 1.1) based on network manager's (20, FIG. 1.1) view of network (10, FIG. 1.1). Consequently, example network device's (100) network data unit forwarding services may take into account additional information beyond that of example network device's (100) local view of network (10, FIG. 1.1).

Network manager agent (106) may perform all, or a portion, of the methods illustrated in FIGS. 2.1-2.4 when providing all, or a portion, of its functionality.

In one or more embodiments disclosed herein, the storage (108) is implemented using devices that provide data storage services (e.g., storing data and providing copies of previously stored data). The devices that provide data storage services may include hardware devices and/or logical devices. For example, storage (108) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (108) may include a memory device (e.g., a dual in line memory device) in which data is stored and from which copies of previously stored data are provided. In another example, storage (108) may include a persistent storage device (e.g., a solid state disk drive) in which data is stored and from which copies of previously stored data is provided. In a still further example, storage (108) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage (108) may store data structures including local network topology data (112), routing information base (120), and/or forwarding information base (118). Each of these data structures is discussed below.

Local network topology data (112) may be implemented using one or more data structures. The data structures may include information regarding a local network environment in which example network device (100) resides. Local network topology data (112) may include any number of portions (e.g., 114, 116) that each include different and/or similar types of information.

For example, each of the portions of local network topology data (112) may include information provided by a network discovery service and/or communication protocol implemented by example network device (100). A first portion of local network topology data (112) may be, for example, a table (e.g., a media access control address table) that associates media access control (MAC) addresses with corresponding egress ports (e.g., a port through which network data units may be forwarded to reach a device having an associated MAC address). A second portion of local network topology data (112) may be, for example, a table (e.g., an address resolution protocol table) that associates internet protocol (IP) addresses with MAC addresses. The local network topology data (112) may include any number of portions that are maintained by any number and type of the network discovery services and/or communication protocols implemented by example network device (100).

Routing information base (120) may be implemented using one or more data structures. The data structures may include information based on the information included in local network topology data (112). Routing information base (120) may be maintained using any number and type of algorithm for selecting the type and quantity of information from local network topology data (112) to be included in routing information base (120). The information included in routing information base (120) may be organized in any manner without departing from embodiments disclosed herein.

Forwarding information base (118) may be implemented using one or more data structures. The data structures may include information that enables information usable for network data unit forwarding purposes to be efficiently identified. For example, forwarding information base (118) may include mappings between information included in network data units and egress information (e.g., port/interface/encapsulation information). Forwarding information base (118) may be maintained using any number and type of algorithms that operate on routing information base (120) and/or local network topology data (112).

As used with respect to routing information base (120) and forwarding information base (118), maintain means to update (e.g., modify, delete, and/or add information) the aforementioned data structures in accordance with changes made to the information upon which the data structures are based. Updating may occur continuously, periodically, at scheduled points in time, responsively to changes, or in other manners. Consequently, the aforementioned data structures may not reflect the information upon which the data structures are based at all points in time.

While the data structures stored in storage (108) have been described as including a limited amount of specific information, any of the data structures stored in storage (108) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number devices without departing from the embodiments disclosed herein.

Additionally, while example network device (100) has been illustrated as including a limited number of specific components, example network device (100) may include fewer, different, and/or additional components without departing from embodiments disclosed herein.

As discussed with respect to FIG. 1.1, network (10) may include network manager (20). Network manager (20) may aggregate information regarding network (10) and use the aggregated information to improve the operation of network (10).

FIG. 1.3 shows a logical diagram of example network manager (150) in accordance with one or more embodiments described herein. Network manager (20) of FIG. 1.1 may be similar to example network manager (150).

To provide the above noted functionality of example network manager (150), example network manager (150) may include network data manager (152) and storage (154). Each of these components of the example network device (100) is discussed below.

In one or more embodiments disclosed herein, network data manager (152) is implemented using a hardware device including circuitry. Network data manager (152) may include, for example, one or more of a digital signal processor, a field programmable gate array, and/or an application specific integrated circuit. The circuitry of the aforementioned devices may be adapted to provide the functionality of network data manager (152). Network data manager (152) may be implemented using other types of hardware devices without departing from the embodiments disclosed herein.

In one or more embodiments disclosed herein, network data manager (152) is implemented using computing code stored on a persistent storage that when executed by a processor of example network manager (150) performs the functionality of network data manager (152). The processor may be a hardware processor including circuitry such as, for example, a central processing unit or a microcontroller. The processor may be other types of hardware devices for processing digital information without departing from the embodiments disclosed herein.

In one or more embodiments disclosed herein, network data manager (152) provides network management services. By providing network management services, the operation of network (10, FIG. 1.1) may be improved by, for example, removing inaccurate information from network devices, improving the efficiency of network data unit routing, etc.

To provide network management services, network data manager (152) may (i) obtain network data from any number of network devices (e.g., network devices of network (10, FIG. 1.1)), (ii) aggregate the obtained network data to generate a broader view of the operation of network (10) than each of the network devices individually sees, (iii) use the aggregated network data to identify improvements that may be made to the network by, for example, modifying the forwarding behavior of one or more network devices, and/or (iv) implementing the identified improvements to network (10, FIG. 1.1). By aggregating network data, network data manager (152) may obtain a more complete view of network (10, FIG. 1.1) thereby enabling network data manager (152) to identify potential areas for improvement of the operation of network (10, FIG. 1.1) that individual network devices are unable to identify individually.

To obtain network data and/or implement improvements to network (10, FIG. 1.1), network data manager (152) may invoke the functionality of network manager agent (106, FIG. 1.2). For example, network data manager (152) may request that network manager agent (106, FIG. 1.2) provide copies of network data, modify network data, or otherwise cause example network device (100) to perform actions that enable network data manager (152) to provide its functionality.

To aggregate the obtained network data, the obtained network data may be integrated with one or more existing data structures (e.g., aggregated network data (162)) that include similar, previously obtained network data (e.g., from other devices and/or obtained at different points in time). When integrating the network data, associations between the integrated information and the network device that provided the network data may be included in the data structure. The information from the network data may be distributed within the aggregated network data (162) in a manner that facilitates further analysis (e.g., inclusion of lookup tables, hash tables, etc.)

Network data manager (152) may perform all, or a portion, of the methods illustrated in FIGS. 2.1-2.4 when providing all, or a portion, of its functionality.

In one or more embodiments disclosed herein, the storage (154) is implemented using devices that provide data storage services (e.g., storing data and providing copies of previously stored data). The devices that provide data storage services may include hardware devices and/or logical devices. For example, storage (154) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (154) may include a memory device (e.g., a dual in line memory device) in which data is stored and from which copies of previously stored data are provided. In another example, storage (154) may include a persistent storage device (e.g., a solid state disk drive) in which data is stored and from which copies of previously stored data is provided. In a still further example, storage (154) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage (154) may store data structures including network data repository (156), aggregated network data (162), and/or enhanced aggregated network data (164). Each of these data structures is discussed below.

Network data repository (156) may be implemented using one or more data structures. The data structures may include information based on the network data (e.g., 110, FIG. 1.2) maintained by one or more network devices. For example, the data structures may include copies of all, or a portion, of the network data maintained by the network devices of network (10, FIG. 1.1). By including the aforementioned information, example network manager (150) may have access to multiple views of network (10, FIG. 1.1).

Network data repository (156) may include any amount of data reflecting the network data of any number of network devices. Network data repository (156) may be logically divided into any number of portions (e.g., 158, 160) reflecting the network data of corresponding network devices.

Aggregated network data (162) may be implemented using one or more data structures. The data structures may include information based on the information included in network data repository (156). By aggregating the information from multiple network devices, the information included in aggregated network data (162) may reflect multiple local views corresponding to multiple network devices of network (10, FIG. 1.1).

For example, aggregated network data (162) may include multiple MAC address tables from multiple network devices. If one of the MAC address tables includes an error, the information included in the other MAC address tables may be used to identify the error.

In another example, aggregated network data (162) may include multiple ARP tables from multiple network devices. If one of the ARP tables lacks an entry (e.g., an IP address to MAC address mapping) included in another ARP table, the entry included in the other ARP table may be used to supplement the ARP table that lacks the entry thereby removing the need for the network device associated with the ARP table that lacks the entry to perform an ARP procedure to learn the mapping.

In a still further example, aggregate network data (162) may include both ARP tables and MAC address tables from multiple network devices. The information included in the aforementioned tables may be used to identify likely network data unit forwarding behavior of network (10, FIG. 1.1) that may be inefficient and/or defective.

Enhanced aggregated network data (164) may be implemented using one or more data structures. The data structures may include information based on information included in the aggregated network data (162) and/or network data repository (156). Enhanced aggregated network data (164) may include a reduced amount of information when compared to aggregated network data (162). The reduction may reflect removal of duplicative information and/or information that is likely to be inaccurate.

While the data structures stored in storage (154) have been described as including a limited amount of specific information, any of the data structures stored in storage (154) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number devices without departing from the embodiments disclosed herein.

Additionally, while example network manager (150) has been illustrated as including a limited number of specific components, example network manager (150) may include fewer, different, and/or additional components without departing from embodiments disclosed herein.

As discussed above, the system of FIG. 1.1 may manage its operation based on a view of the system using information aggregated from multiple network devices. FIGS. 2.1-2.4 show diagrams of methods that may be performed components of the system of FIG. 1.1 in accordance with one or more embodiment disclosed herein when managing the operation of network (10).

FIG. 2.1 shows a flowchart describing a method for managing the operation of a network in accordance with one or more embodiments disclosed herein. The method may be performed by, for example, a network data manager (e.g., 152, FIG. 1.3) of a network manager. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 200, network data from at least two network devices is obtained. The network data from the at least two network devices may be obtained at any (e.g., similar or different) points in time.

In one or more embodiments disclosed herein, the network data is obtained by sending requests for the network data to network manager agents (e.g., 106, FIG. 1.2) hosted by the network devices. The network manager agents may provide all, or a portion, of the network data maintained by the respective network devices. For example, each of the network manager agents may only send portions of the network data that represents stale data (i.e., portions of the network data that have changed since network data was last provided). If no network data has been previously provided, all of the network data may be provided.

In one or more embodiments disclosed herein, the network data is obtained without sending requests for the network data to the network manager agents hosted by the network devices. The network manager agents may provide portions of the network data corresponding to stale network data (i) at predetermined points in time, (ii) in response to the occurrence of predetermined events (e.g., a particular amount of stale data has been identified, an amount of time has elapsed since network data was previously provided, etc.), and/or (iii) based on other methods of determining when portions of the network data corresponding to stale network data is to be provided.

Once the network data is obtained, it may be stored as part of a network data repository (e.g., 156). The network data may be stored, for example, in volatile storage (e.g., memory) and/or in persistent storage. The network data may be stored as part of pre-existing network data corresponding to each device by updating the pre-existing network data or may be stored independently.

In step 202, the obtained network data is aggregated to obtain aggregated network data.

In one or more embodiments disclosed herein, the network data is aggregated by adding information based on the network data to pre-existing aggregated network data (e.g., 162, FIG. 1.3). As discussed above, aggregated network data may be maintained by a network manager. The obtained network data may be used to update, supplement, or otherwise improve the accuracy, completeness, or timeliness of the pre-existing aggregated network data (reflecting network data obtained from any number of network devices).

For example, the obtained network data may include any number of tables that include different types of information regarding the network environment in which the network devices reside. Similar tables that include information from multiple network devices may be included in the pre-existing aggregated network data. The pre-existing aggregated network data may be aggregated with the obtained network data by (i) adding new information included in the network data to the pre-existing aggregated network data and (ii) removing stale information from the pre-existing aggregated network data.

While described with respect to tables corresponding to different types of information, the pre-existing aggregated network data and obtained network data may utilize different formats (e.g., databases, lists, etc.) and may not include demarcations between different types of data without departing from embodiments disclosed herein.

The obtained network data may include (i) network data used to forward network data units, (ii) network data regarding the topology of the network and used to obtain the network data used to forward network data units, and/or (iii) other types of information that may be maintained by network devices to provide their functionalities.

In step 204, enhanced network data that indicates the presence of a network flaw of the network is obtained. The network flaw may not be indicated by either portion of the network data (e.g., obtained in step 200) obtained from the two network devices in isolation from the other portion.

In one or more embodiments of the invention, the enhanced network data is obtained by analyzing the aggregated network data. The analysis of the aggregated network data may include one or more of: (i) identifying inaccurate information that was provided by a network device based on information obtained from a second network device, (ii) identifying information that is not present in network data obtained from one network device based on information obtained from a second network device, (iii) eliminating redundant information included in the aggregated network data (e.g., multiple network devices may provide the same information), (iv) generating associations (e.g., doubles, tuples, etc.) between different portion of the aggregated network data that are not apparent from the respective portions of the aggregated network data obtained from different network devices, (v) generating a unified routing information base reflective of the totality of the network environment in which the network devices reside including, for example, internet protocol to media access control address mappings, media access control address to interface (e.g., port/encapsulation/equal cost multipath groups) mappings, etc., (vi) generating a utified forwarding information base including, for example, destination internet protocol to interface mappings, and/or (vii) other types of analysis of all, or a portion, of the aggregated network data to identifying information that is present in the aggregate network data but that is not present in any portion of the network data obtained from each network device in isolation.

In one or more embodiments of the invention, the network flaw is behavior of the network that is not desired. For example, the network flaw may be the lack of information available to a network data (e.g., lacking mappings), incorrect information maintained by a network device, the presence of a characteristic (e.g., a loop, black hole, or other topological feature) of the network (based on network information maintained by any number of network devices) that leads to overconsumption of computing resources for performance of the functionality of the network, and/or other network data unit forwarding behavior of the network that is not desired. As used herein, a not desired network data unit forwarding behavior is one that diverges from intentional or designed network data unit forwarding behavior.

The enhanced network data may be obtained by, for example, updating existing enhanced network data, generating a new data structure for the enhanced network data, and/or repurposing the aggregated network data as the enhanced network data by modifying its contents. For example, the aggregated and/or enhanced network data may include any number of tables or other types of data structures. The aforementioned data structures may be generated and/or modified to obtain the enhanced network data.

In step 206, a network enhancement action set is performed using the enhanced network data to remediate the network flaw. By enhancing the operation of the network, the network may (i) more efficiently forward network data units (e.g., reduced number of hops to destination), (ii) may enable administrators of the network to better understand how the network operates, (iii) may reduce the quantity of computing resources (e.g., processor cycles, memory space, storage space, network communication bandwidth, etc.) needed to forward network data units, and/or (iv) proactively prevent likely network data unit forwarding behavior of the network that is likely to be inefficient.

Performing a network enhancement action set may include one or more of: (i) correcting inaccurate information that was provided by a network device (e.g., providing the network device with correct information that may be used to modify the network data unit forwarding behavior of the network device), (ii) notifying administrators or other persons of the presence of the network flaw, (iii) generating visualizations of likely network data unit forwarding routes through the network using the enhanced network data (and/or the aggregated network data), (iv) providing information to a network device regarding the network that the network device likely lacks (e.g., providing associations between media access control addresses and interfaces, internet protocol to media access control address mappings, etc.), and/or (v) proactively identifying and/or remediating network data unit forwarding behavior (e.g., network congestion, network routing loops, etc.) that is likely to negatively and/or undesirably impact the ability of the network to forward network data units.

In one or more embodiments disclosed herein, the network enhancement action set is performed using one or more of the methods illustrated in FIGS. 2.2-2.4. The network enhancement action set may be performed via other methods without departing from the invention.

In one or more embodiments disclosed herein, the network data unit forwarding behavior of at least one network device of a network by performing the network enhancement set. For example, by performing the network enhancement action set, a change in network data unit forwarding behavior of a network device may be identified. To modify the network data unit forwarding behavior of the network device, a request may be sent to the network device to change a portion of its network data. By changing its network data, the information used to forward network data units may be changed thereby causing the network device to change the manner in which it forwards network data units.

The method may end following step 204.

By managing a network, as illustrated in FIG. 2.1, embodiments disclosed herein may provide a network with improved performance by utilizing multiple views of a network to guide the operation of the network.

Additionally, by aggregating network data as illustrated in FIG. 2.1, embodiments disclosed herein may enable (i) the structure of the network as it changes over time to be monitored and (ii) provide a wider view into how the network is operating to administrators or other persons than would be available from any network device individually. By doing so, the cognitive and effort burdens on administrators may be reduced thereby enabling the network to be more efficiently and/or better managed. Consequently, the network data unit forwarding (and/or other types of functionality of the network) behavior of the network may be improved.

As discussed above, FIGS. 2.2-2.4 show methods that may be used to perform a network enhancement action set thereby modifying the operation of the network. Each of these methods are discussed below.

FIG. 2.2 shows a flowchart describing a method for enhancing a network in accordance with one or more embodiments disclosed herein. The method may be performed by, for example, a network data manager (e.g., 152, FIG. 1.3) of a network manager. Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In Step 210, identify, using enhanced network data, a conflict between two portions of network data obtained from two network devices.

In one or more embodiments disclosed herein, the conflict is caused by a network device incorrectly learning (and/or static programming of the network device) an association between a second network device and information that may be used to forward network data units toward the second network device. As part of its operation, the network device may attempt to obtain information (e.g., learning) regarding the network environment in which the network device resides. The network device may use this information to make decisions regarding how to forward network data units. However, the obtained information may be inaccurate. Consequently, decisions based on the inaccurate information may negatively impact the quality of services (e.g., network data unit forwarding services) provided by the network device.

When network data from a first network device that includes inaccurate information is aggregated with network data from other network devices, conflicts between the inaccurate information and the network data from the other network devices may be ascertainable by analyzing the enhanced network data for conflicts.

For example, consider a scenario where the network data from multiple network devices include MAC address tables which each associate MAC addresses with forwarding information for corresponding network devices. The MAC address tables may be used to ascertain the port connectivity between various network devices of a network. If an entry of a MAC address table is incorrectly learned, the entry will appear to be in conflict with the ascertained port connectivity between the network devices of the network. Consequently, an entry of the MAC address table that is inaccurate and other entries of the MAC address tables will be able to be identified as being in conflict. When the enhanced network data is generated, such inaccuracies may be flagged by, for example, adding metadata to the enhanced network data reflecting the inaccuracies identified. Similar procedures may be used to identify conflicts in other types of information included in network data from multiple network devices.

In step 212, the conflict is resolved.

In one or more embodiments disclosed herein, the conflict is resolved by removing the portion of the enhanced network data that was determined as being inaccurate in step 210 from the enhanced network data. Removing the portion of the enhanced network data may likely enhance the accuracy of the enhanced network data. When such information is removed, metadata may be added to indicate the removal of the information, the reason for the removal, network devices that might be impacted (e.g., might still include the inaccurate information in their network data) by the removal, etc. As noted above, a conflict may indicate that a portion of the enhanced network data is likely to be inaccurate. Removing the likely inaccurate information may improve resulting decisions made using the enhanced network data.

In one or more embodiments disclosed herein, the conflict is resolved by replacing the portion of the enhanced network data that was determined as being inaccurate in step 210 with information that is more likely to be accurate. Replacing the portion of the enhanced network data may likely enhance the accuracy of the enhanced network data. For example, when an entry of a MAC address table is determined as being likely inaccurate, more likely to be accurate information from other tables may be used to replace the inaccurate entry of the MAC address table.

In step 214, an update based on the resolved conflict is provided to a network device. Providing the update based on the resolved conflict may cause the network device (associated with the resolved conflict) to modify its network data to reflect the information included in the enhanced network data.

In one or more embodiments disclosed herein, the update is a data modification instruction. Upon receipt of the data modification instruction, the network device associated with the resolved conflict may modify its network data to implement the update.

In one or more embodiments disclosed herein, the update is a state update. The state update may indicate a new state of a portion of network data of the network device. The new state may be based on the resolution of step 212. The new state may be, for example, an empty entry (e.g., removal of inaccurate information) or a new value for an entry (e.g., replacement of inaccurate information with accurate information) of the network data of the network device.

When the network device obtains the state update, a state management system of the network device may apply the changes indicated by the entry in accordance with the management scheme employed by the state management system. The network device may implement any state management system without departing from embodiments disclosed herein.

The network device to which the update is provided may be the network device which is determined to have provided inaccurate information as part of its network data. The update may be provided to the network device in any manner without departing from the invention. For example, the update may be provided by sending a message including the update to the network device, the update may be published for consumption by the network device, etc.

In one or more embodiments disclosed herein, the update is implemented as a data structure that includes information reflecting the update. The network device may read, interpret, and/or take action based on the update. The update may be implemented via other methods without departing from embodiments disclosed herein. For example, the update may be implemented as an executable entity that when executed by the network device causes the update to be implemented by the network device.

The method may end following step 214.

By enhancing a network, as illustrated in FIG. 2.2, embodiments disclosed herein may improve network data forwarding behavior across the network by improving the accuracy of information used by individual network devices to make network data forwarding unit decisions, state management decisions, or other types of decisions that govern the operation of the network devices.

Additionally, by generating enhanced network data, a broad view of a network environment may be provided to administrators or other persons. For example, the enhanced network data may be used to identify likely paths over which network data units will traverse the network. Visualizations of the likely paths may be generated to illustrate to the administrators or other persons topological features of the network environment. Such visualizations may not be able to be generated using information obtained from only a single network device. Further, if generated based on information obtained from network devices in isolation of other information, the resulting view of the network may be inaccurate due to inaccurate information maintained by a network device. By providing such visualizations and access to enhanced network data to administrators, the cognitive burden on administrators for managing a network environment may be reduced by enabling the administrators to rely on the accuracy and completeness of the network data.

For example, network administrators may be able to visualize network data unit flow including, for example, loops, black holes, or other topological features. The aforementioned features may be identified by (i) simulating (e.g., injecting fictitious network data units at various points in the network) network data unit flows using the information included in the aggregated network data, (ii) algorithmically analyzing (e.g., using information flow theory) the topology of the network, and/or (iii) employing any other types of methods to identify information regarding the network environment using the enhanced network data.

FIG. 2.3 shows a flowchart describing a method for enhancing a network in accordance with one or more embodiments disclosed herein. The method may be performed by, for example, a network data manager (e.g., 152, FIG. 1.3) of a network manager. Other entities may perform the method of FIG. 2.3 without departing from embodiments disclosed herein.

While the various steps in the flowchart shown in FIG. 2.3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 220, an IP address to MAC address mapping is identified using enhanced network data. The IP address to MAC address mapping may be identified via any method without departing from embodiments disclosed herein. For example, the IP address to MAC address mapping may be one that is known to a first network device but is unknown to a second network device.

In one or more embodiments disclosed herein, the IP address to MAC address mapping is learned by the first network device of a network thereby resulting in it being integrated into the enhanced network data via the method illustrated in FIG. 2.1. When integrated, metadata may be added to the enhanced network data indicating whether the mapping is known or unknown to any number of network devices. For example, the IP address to MAC address mapping may be learned by the first network device by implementing the ARP, implementing a network data unit inspection method as part of a network discovery protocol or communication protocol, or via another method. A second network device that also provide network data integrated into the enhanced network data may not have access to the IP address to MAC address mapping (due to, for example, is location within the network or for other reasons). The second network device may not have access to the IP address to MAC address mapping because, for example, the second network device has not yet performed an ARP necessary to obtain information included in the mapping.

In step 222, a network device that does not have access to the IP address to MAC address mapping is identified.

In one or more embodiments disclosed herein, the network device is identified by comparing the IP address to MAC address mapping to network data provided by the network device that does not have access to the mapping. Alternatively, metadata reflecting such a determination included in the enhanced network data may be used. By identifying that the IP address to MAC address mapping is not present in the network data of another network device, the network manager may identify that the other network device lacks the IP address to MAC address mapping. The identification may be made using any algorithm to perform the comparison and/or metadata analysis without departing from embodiments disclosed herein.

In step 224, an update based on the IP address to MAC address mapping is provided to the identified network device. Providing the update based on the IP address to MAC address mapping may cause the network device to modify its network data to reflect the IP address to MAC address mapping. By doing so, the identified network device may learn the mapping without needing to perform a network discovery protocol or otherwise expend resources of the network to obtain the mapping.

In one or more embodiments disclosed herein, the update is a data modification instruction. Upon receipt of the data modification instruction, the identified network device may modify is network data to implement the update.

In one or more embodiments disclosed herein, the update is a state update. The state update may indicate a new state of a portion of network data of the network device. The new state may be based on the IP address to MAC address mapping. The new state may be, for example, a new value for a new entry (e.g., addition of new information) of the network data of the network device.

When the network device obtains the state update, a state management system of the network device may apply the changes indicated by the entry in accordance with the management scheme employed by the state management system. The network device may implement any state management system without departing from embodiments disclosed herein.

The update may be provided to the identified network device in any manner without departing from the invention. For example, the update may be provided by sending a message that includes the update to the network device, the update may be published for consumption by the network device, etc.

In one or more embodiments disclosed herein, the update is implemented as a data structure that includes information based on the IP address to MAC address mapping. The network device may read, interpret, and/or take action based on the update. The update may be implemented via other methods without departing from embodiments disclosed herein. For example, the update may be implemented as an executable entity that when executed by the network device causes the update to be implemented by the network device.

The method may end following step 224.

By performing a network enhancement action set, as illustrated in FIG. 2.3, embodiments disclosed herein may improve network data forwarding behavior across the network by allowing network devices to learn information regarding the network without needing to perform network discovery protocols. Consequently, the computational cost for enabling the network devices of a network to perform learning required for forwarding network data units may be reduced.

FIG. 2.4 shows a flowchart describing a method for enhancing a network in accordance with one or more embodiments disclosed herein. The method may be performed by, for example, a network data manager (e.g., 152, FIG. 1.3) of a network manager. Other entities may perform the method of FIG. 2.4 without departing from embodiments disclosed herein.

While the various steps in the flowchart shown in FIG. 2.4 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 230, a network data unit path analysis of a network using IP address to next hop information mappings of enhanced network data is performed to identify a network deficiency. The aforementioned mappings may reflect information included in the forwarding information bases of multiple network devices that is used, in part, as the basis for the enhanced network data.

As discussed above, the forwarding information bases of each network device may include information that efficiently enables information (e.g., next hop information) that may be used to forward a network data unit without resorting to computationally costly lookups through multiple tables or other types of data structures. These mappings may be used to identify the likely paths through which network data units will traverse a network.

Using the likely paths that network data units will traverse a network, network deficiencies that reduce the ability of the network to forward network data units (or otherwise diverge from desired behavior) may be identified. For example, the likely flows of network data unit through the network may be used to identify loops in the network. Loops in a network may cause network data units to flow through paths to their destinations in an inefficient manner (e.g., more hops) or prevent network data units from reaching their destination at all. In another example, the likely flows of network data units through the network may be used to identify likely points of congestion (e.g., network devices to which multiple, high traffic flow network devices are likely to preferentially forward network data units). The network data unit path analysis may be performed to identify any number and/or type (including other types of deficiencies not discussed above) of network deficiencies (e.g., black holes).

In step 232, a type of the identified network deficiency is identified. When a network deficiency is identified, the manner in which to correct or otherwise remediate the impact of the network deficiency may depend on the type of the deficiency (e.g., loop, congestion point, etc.). The type of the deficiency may be identified by, for example, comparing characteristics (e.g., structure) of the deficiency to a database of types corresponding to different characteristics. The characteristics may include, for example, the number of network devices contributing to the deficiency, a topological networking arrangement of the network devices contributing to the deficiency, etc. The database may be developed in any manner (e.g., heuristically) without departing from embodiments disclosed herein. The database may also specify, for example, one or more changes to a network to correct and/or remediate a network deficiency corresponding to the type of the network deficiency.

In step 234, an action set based on a type of the network deficiency is performed to resolve the network deficiency.

In one or more embodiments disclosed herein, the action set includes sending at least one update to at least one network device associated with the network deficiency. The at least one update may include a change to a manner in which the at least one network device forwards network data units.

For example, consider a scenario where the network deficiency is a loop. In such a scenario, the update may include a change in the forwarding information (e.g., forwarding information base that includes associations between destination IP addresses and interface information) of a forwarding information base maintained by the at least one network device. The change in forwarding information may direct network data units out of the loop. Consequently, the loop may be eliminated from the topology of the network in which the network device resides.

In one or more embodiments disclosed herein, the update is a state update. The state update may indicate a new state of a portion of network data (e.g., a portion of a forwarding information base) of the network device. The new state may be based on an IP address to forwarding information mapping that will resolve the network deficiency if implemented by the network device. The new state may be, for example, a new value for an existing entry (e.g., replacement of existing information) of the network data of the network device.

When the network device obtains the state update, a state management system of the network device may apply the changes indicated by the entry in accordance with the management scheme employed by the state management system. The network device may implement any state management system without departing from embodiments disclosed herein.

The update may be provided to the identified network device in any manner without departing from the invention. For example, the update may be provided by sending a message that includes the update to the network device, the update may be published for consumption by the network device, etc.

In one or more embodiments disclosed herein, the update is implemented as a data structure that includes information based on the IP address to forwarding information mapping. The network device may read, interpret, and/or take action based on the update. The update may be implemented via other methods without departing from embodiments disclosed herein. For example, the update may be implemented as an executable entity that when executed by the network device causes the update to be implemented by the network device.

The method may end following step 234.

By enhancing a network, as illustrated in FIG. 2.4, embodiments disclosed herein may improve network data forwarding behavior across the network by eliminating topological network deficiencies. Consequently, the network may more efficiently forward network data units through the network thereby reducing the computational cost for forwarding network data units.

Additionally, by identifying networking deficiencies, a broad view of a network environment may be provided to administrators or other persons. For example, visualizations of the network deficiencies may be used to illustrate to the administrators or other persons topological features of the network environment. By providing such visualizations and access, the cognitive burden on administrators for managing a network environment may be reduced.

As discussed above, embodiments disclosed herein may be implemented using a network device. In one or more embodiments, a network device is implemented as a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 10, FIG. 1.1) include, but are not limited to, a network switch, a router, a multilayer switch, a fiber channel device, an InfiniBand® device, etc. A network device (e.g., 10, FIG. 1.1) is not limited to the aforementioned specific examples.

In one or more embodiments disclosed herein, a network device (e.g., 15A, 15N, FIG. 1.1) includes functionality to receive network data units (e.g., frames, packets, tunneling protocol frames, etc.) at any of the physical network interfaces (i.e., ports) of the network device (e.g., 10, FIG. 1.1) and to process the network data units (collectively "network traffic"). In one or more embodiments disclosed herein, processing a network data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network data unit in order to transmit the network data unit from an interface of the network device (e.g., 15A, 15N, FIG. 1.1).

In one or more embodiments, a network device (e.g., 15A, 15N, FIG. 1.1) also includes and/or is operatively connected to device persistent storage and/or device memory (i.e., non-transitory computer readable mediums used to provide persistent storage resources and/or memory resources) storing software and/or firmware.

Such software and/or firmware may include instructions which, when executed by the one or more processors) of a network device (e.g., 15A, 15N, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 15A, 15N, FIG. 1.1) is part of a network (e.g., 10, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network devices (e.g., 15, FIG. 1.1)) that facilitate network connectivity for one or more operatively connected devices (e.g., computing devices, data storage devices, other network devices, etc.). In one or more embodiments, the network devices (e.g., 15, FIG. 1.1) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments disclosed herein, a non-limiting example is provided in FIGS. 3.1-3.5. FIGS. 3.1-3.5 may illustrate a system similar to that illustrated in FIG. 1.1. FIGS. 3.1-3.5 may include information regarding the network data maintained by each of the respective devices over time. For the sake of brevity, only a limited number of components of the system of FIG. 1.1 are illustrated in each of FIGS. 3.1-3.5.

Beginning of Example

Consider a scenario as illustrated in FIG. 3.1 in which a network includes network manager (300), first network device (306), and two client devices (302, 304). The client devices may utilize network data unit forwarding services provided by first network device (306). For example, first client device may be operably connected to port P1 (306.2) via its port P1 (302.2). Second client device (304) may be operably connected to port P2 (306.4) via its port P1 (304.2). Network manager (300) may be operably connected to first network device (306) via port P3 (306.6) of first network device (306). The aforementioned devices may be operably connected to one another via the paths illustrated using line segments terminating in arrows.

Each of the devices of FIG. 3.1 include a network interfaces that utilizes respective MAC addresses. For example, first client device (302) uses MAC address 00-43-C2-E9-81-D1 on port P1 (302.2) as indicated by the dashed box connected to port P1 (302.2) of first client device (302) by a dashed line.

To configure the network of FIG. 3.1 for operation, an administrator has added MAC address 00-43-C2-E9-81-D1 as being reachable via port P1 (306.2) of first network device (306) as indicated by the dashed box connected to first network device (306) by a dashed line.

At a second point in time as illustrated in FIG. 3.2, an administrator of the network changes the topology by adding second network device (308). First client device (302) is connected to second network device via port P1 (308.2) of second network device (308) and first network device (306) is connected to second network device (308) via port P2 (308.4) of second network device (308). By adding second network device (308), the capacity of the network may be improved. However, doing so has also caused the MAC table maintained by first network device (306) to include inaccurate information. In other words, MAC address 00-43-C2-E9-81-D1 is no longer directly reachable via port P1 (306.2). Rather, port P1 (306.2) now reaches port P2 (308.4) of second network device (308) rather than port P1 (302.2) of first client device (302).

As the network devices operate (e.g., forward network data units between themselves and/or other devices not illustrated in FIG. 3.1), the network devices begin to learn information regarding their network environment through network discovery protocols, network data unit mining as part of communication protocols implemented by the network devices etc. As part of learning the topology of the network, second network device (308) learns that MAC address 00-43-C2-E9-81-D1 is reachable via port P1 (308.2) as illustrated in FIG. 3.3 and indicated by the dashed box connected to second network device (308) via a dashed line. Thus, at the point in time illustrated in FIG. 3.3, second network device (308) includes accurate MAC address information in its MAC table while first network device (306) includes inaccurate information. Because the inaccurate information was manually entered, first network device (306) will not eliminate the inaccurate information from its MAC table resulting in persistent, inaccurate information being included in the MAC table of first network device (306).

Turning to FIG. 3.4, network manager (300) obtains network data from each of the network devices (e.g., 306, 308). As seen in the dashed box connected to network manager (300) via a dashed line, the network data includes an inconsistency. Namely, that both network devices are connected to P1 of first client device (302).

To address this conflict, network manager (300) generates, as illustrated in FIG. 3.5, enhanced network data by (i) identifying the presence of the conflict, (ii) eliminating the conflict by removing the MAC address entry provided by first network device (306), and (iii) adding metadata indicating that inaccurate information was removed from the aggregated network data when forming the enhanced network data.

After network manager (300) identifies that the inaccuracy exists in first network device (306) based on the enhanced network data, network manager (300) generates a MAC address table state update (310) to resolve the inaccuracy. Specifically, the MAC address table state update (310) specifies that first network device (306) is to remove the entry corresponding to the inaccurate information from its network data. Network manager (300) provides the update to first network device (306) as indicated in FIG. 3.5 by the arrow having a long dashed tail.

When first network device (306) receives MAC address table state update (310), first network device (306) updates the state of its MAC address table to correspond to the update. Specifically, the entry corresponding to 00-43-C2-E9-81-D1/P1 is removed. Consequently, first network device (306) is forced to relearn the entry. By doing so, incorrect information is removed from its network data and replaced with accurate information once the learning is complete.

End of Example

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments disclosed herein may provide a network that aggregates network data from multiple sources within the network (e.g., multiple network devices). By doing so, network management decisions may be made based on a broader view of the network environment than is provided to any individual entity. Consequently, the network may more efficiently forward network data units through the network, potential network deficiencies may be proactively remediated, and/or the computational cost for obtaining information used to make network data unit forwarding decisions (e.g., IP address to MAC address mappings) may be reduced by providing such information from entities that have already obtained the information to entities that lack the information.

Additional embodiments disclosed herein may reduce the cognitive burden on administrators and/or other persons for understanding the operation of the network. By providing an aggregated source of information regarding the topology of the network, visualizations of the network topology or other intuitive graphical illustration of information useful to understand the operation of the network may be provided.

Consequently, administrators and/or other persons may more easily perform maintenance, upgrade, or otherwise modify the operation of the network.

Thus, embodiments disclosed herein may address the problem of limited resources of both networks and/or persons for managing networks. While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network manager communicatively coupled to at least two network devices and configured to manage a network that comprises the at least two network devices, wherein the network manager, comprises:
    a processor;
    a storage storing network data obtained from the at least two network device, the network data comprising:
        a first portion obtained from a first network device of the at least two network devices, and
        a second portion obtained from a second network device of the at least two network devices; and
    a network data manager, which when executed by the processor, is programmed to:
        obtain the network data;
        compare the first portion of the network data to the second portion of the network data;
        determine, based on the comparison, that there is an inconsistency between the first portion and the second portion of the network data;
        obtain, based on the determination, enhanced network data that indicates a presence of a network flaw within the network, wherein the network flaw is indicated by the inconsistency between the first portion and the second portion of the network data and cannot be indicated by either of the first portion or the second portion in isolation from the other portion; and
        perform a network enhancement action set using the enhanced network data to remediate the network flaw,
    wherein the network data manager further adds metadata associated with the network flaw to the enhanced network data.

2. The network manager of claim 1, wherein obtaining the enhanced network data comprises:
    integrating a first network topology table associated with the first network device of the at least two network devices with a second network topology table associated with the second network device of the at least two network devices.

3. The network manager of claim 1, wherein obtaining the enhanced network data comprises:
    integrating a first routing information base associated with the first network device of the at least two network devices with a second routing information base associated with the second network device of the at least two network devices.

4. The network manager of claim 1, wherein obtaining the enhanced network data comprises:
    integrating a first forwarding information base associated with the first network device of the at least two network devices with a second forwarding information base associated with the second network device of the at least two network devices.

5. The network manager of claim 1, wherein performing the network enhancement action set using the enhanced network data to remediate the network flaw comprises:
    identifying a conflict between the first portion of the network data and the second portion of the network data;
    resolving the conflict; and
    sending a state update based on the resolved conflict to at least one of the at least two network devices.

6. The network manager of claim 5, wherein the state update is adapted to prompt a change in network data unit forwarding behavior by the at least one of the at least two network devices.

7. The network manager of claim 1, wherein performing the network enhancement action set using the enhanced network data to remediate the network flaw comprises:
    identifying an internet protocol (IP) address to media access control (MAC) address mapping in the network data;
    identifying that at least one of the at least two network devices does not have access to the identified IP address to MAC address mapping; and
    sending a state update based on the IP address to MAC address mapping to the at least one of the at least two network devices.

8. The network manager of claim 7, wherein the state update specifies that the IP address to MAC address mapping is to be added to an address resolution protocol table maintained by the at least one of the at least two network devices.

9. The network manager of claim 1, wherein performing the network enhancement action set using the enhanced network data to remediate the network flaw comprises:
    performing a network data unit path analysis of the network using internet protocol (IP) address to next hop information of the enhanced network data to identify a network data unit forwarding deficiency; and
    performing a network data unit forwarding deficiency remediation action set based on a type of the network deficiency to resolve the network deficiency.

10. The network manager of claim 9, wherein performing the network data unit forwarding network deficiency remediation action set comprises:
    sending a state update adapted to modify network data forwarding behavior of at least one of the at least two network devices.

11. The network manager of claim 1, wherein the metadata specifies the inconsistency between the first portion and the second portion of the network data.

12. The network manager of claim 1, wherein the metadata specifies the network enhancement action set used to remediate the network flaw.

13. A method, comprising:
    obtaining, from at least two network devices, network data comprising:
        a first portion obtained from a first network device of the at least two network devices, and
        a second portion obtained from a second network device of the at least two network devices;

comparing the first portion of the network data to the second portion of the network data;
determining, based on the comparison, that there is an inconsistency between the first portion and the second portion of the network data;
obtaining, based on the determination, enhanced network data that indicates a presence of a network flaw within the network, wherein the network flaw is indicated by the inconsistency between the first portion and the second portion of the network data and cannot be indicated by either of the first portion or the second portion in isolation from the other portion; and
performing a network enhancement action set using the enhanced network data to remediate the network flaw,
wherein the network data manager further adds metadata associated with the network flaw to the enhanced network data.

14. The method of claim 13, wherein performing the network enhancement action set using the enhanced network data to remediate the network flaw comprises:
identifying a conflict between the first portion of the network data and the second portion of the network data;
resolving the conflict; and
sending a state update based on the resolved conflict to at least one of the at least two network devices.

15. The method of claim 14, wherein the state update is adapted to prompt a change in network data unit forwarding behavior by the at least one of the at least two network devices.

16. The method of claim 13, wherein performing the network enhancement action set using the enhanced network data to remediate the network flaw comprises:
identifying an internet protocol (IP) address to media access control (MAC) address mapping in the network data;
identifying that at least one of the at least two network devices does not have access to the identified IP address to MAC address mapping; and
sending a state update based on the IP address to MAC address mapping to the at least one of the at least two network devices.

17. The method of claim 16, wherein the state update specifies that the IP address to MAC address mapping is to be added to an address resolution protocol table maintained by the at least one of the at least two network devices.

18. A non-transitory computer readable medium comprising computer readable program code, which when executed by a computer processor enables the computer processor to perform a method, the method comprising:
obtaining, from at least two network devices, network data comprising:
a first portion obtained from a first network device of the at least two network devices, and
a second portion obtained from a second network device of the at least two network devices;
comparing the first portion of the network data to the second portion of the network data;
determining, based on the comparison, that there is an inconsistency between the first portion and the second portion of the network data;
obtaining, based on the determination, enhanced network data that indicates a presence of a network flaw within the network, wherein the network flaw is indicated by the inconsistency between the first portion and the second portion of the network data and cannot be indicated by either of the first portion or the second portion in isolation from the other portion; and
performing a network enhancement action set using the enhanced network data to remediate the network flaw,
wherein the network data manager further adds metadata associated with the network flaw to the enhanced network data.

19. The non-transitory computer readable medium of claim 18, wherein performing the network enhancement action set using the enhanced network data to remediate the network flaw comprises:
identifying a conflict between the first portion of the network data and the second portion of the network data;
resolving the conflict; and
sending a state update based on the resolved conflict to at least one of the at least two network devices.

20. The non-transitory computer readable medium of claim 19, wherein the state update is adapted to prompt a change in network data unit forwarding behavior by the at least one of the at least two network devices.

21. The non-transitory computer readable medium of claim 18, wherein performing the network enhancement action set using the enhanced network data to remediate the network flaw comprises:
identifying an internet protocol (IP) address to media access control (MAC) address mapping in the network data;
identifying that at least one of the at least two network devices does not have access to the identified IP address to MAC address mapping; and
sending a state update based on the IP address to MAC address mapping to the at least one of the at least two network devices.

22. The non-transitory computer readable medium of claim 21, wherein the state update specifies that the IP address to MAC address mapping is to be added to an address resolution protocol table maintained by the at least one of the at least two network devices.

* * * * *